United States Patent
Hanson et al.

(10) Patent No.: US 7,805,712 B2
(45) Date of Patent: *Sep. 28, 2010

(54) SYSTEM AND METHOD FOR MULTI-THREADED RESOLVER WITH VERSIONING

(75) Inventors: Timothy Hanson, Seattle, WA (US); Jesse Michael Garms, Seattle, WA (US); Timothy Allen Wagner, Seattle, WA (US)

(73) Assignee: BEA Systems, Inc., San Jose, CA (US)

( * ) Notice: Subject to any disclaimer, the term of this patent is extended or adjusted under 35 U.S.C. 154(b) by 1098 days.

This patent is subject to a terminal disclaimer.

(21) Appl. No.: 11/493,316

(22) Filed: Jul. 26, 2006

(65) Prior Publication Data

US 2007/0038980 A1    Feb. 15, 2007

Related U.S. Application Data

(60) Provisional application No. 60/704,034, filed on Jul. 29, 2005.

(51) Int. Cl.
*G06F 9/45* (2006.01)

(52) U.S. Cl. .................. 717/140; 717/149
(58) Field of Classification Search ......... 717/106–108, 717/140, 149
See application file for complete search history.

(56) References Cited

U.S. PATENT DOCUMENTS

| | | | |
|---|---|---|---|
| 6,360,220 B1 * | 3/2002 | Forin .................. 1/1 |
| 6,496,909 B1 * | 12/2002 | Schimmel ............ 711/163 |
| 6,925,638 B1 * | 8/2005 | Koved et al. ......... 717/155 |
| 7,278,057 B2 * | 10/2007 | Betancourt et al. ..... 714/38 |
| 7,610,585 B2 * | 10/2009 | Shpeisman et al. ..... 718/102 |
| 7,673,181 B1 * | 3/2010 | Lindo et al. ............ 714/38 |
| 2003/0149966 A1 * | 8/2003 | McGuire ............... 717/148 |
| 2004/0215944 A1 * | 10/2004 | Burky et al. .......... 712/244 |
| 2005/0114771 A1 * | 5/2005 | Piehler et al. ......... 715/536 |
| 2005/0246695 A1 * | 11/2005 | Wang ................... 717/148 |
| 2005/0262159 A1 * | 11/2005 | Everhart et al. ....... 707/201 |
| 2005/0289549 A1 * | 12/2005 | Cierniak et al. ....... 718/102 |
| 2006/0005171 A1 * | 1/2006 | Ellison ................. 717/131 |
| 2006/0225078 A1 * | 10/2006 | Anderson ............. 718/104 |
| 2007/0006198 A1 * | 1/2007 | Kakivaya et al. ...... 717/151 |
| 2007/0011671 A1 * | 1/2007 | Kahlon et al. ......... 717/170 |
| 2008/0098374 A1 * | 4/2008 | Adl-tabatabai et al. .. 717/145 |

OTHER PUBLICATIONS

"Java theory and practice: To mutate or not to mutate?", Brian Goetz. Feb. 18, 2003. IBM DeveloperWorks.*

* cited by examiner

*Primary Examiner*—Anna Deng
(74) *Attorney, Agent, or Firm*—Squire, Sanders & Dempsey LLP (57) ABSTRACT

A method for resolving a type in a programming language to a resolve stage is provided. The method includes determining whether a version at the resolve stage of the type exists. The method further includes, if the version at the resolve stage does not exist, allowing a thread exclusive access to the type, resolving the type from an original resolve stage to the resolve stage, by the thread, by adding resolution information for the resolve stage to the type, and creating the version of the type based on the resolving by creating a copy of the type, where the copy of the type is at the resolve stage. Two or more versions are associated with the type, and the two or more versions are at different resolve stages.

20 Claims, 6 Drawing Sheets

SYSTEM AND METHOD FOR MULTI-THREADED RESOLVER WITH VERSIONING

CLAIM OF PRIORITY

This application claims benefit from U.S. Provisional Patent Application No. 60/704,034 entitled MULTI-THREADED RESOLVER WITH VERSIONING; by Timothy Hanson, Jesse Michael Garms, Timothy Allen Wagner, filed Jul. 29, 2005, which is hereby incorporated by reference in its entirety.

CROSS-REFERENCE TO RELATED APPLICATIONS

This application is related to the following co-pending application(s) which are each hereby incorporated by reference in their entirety:

U.S. application Ser. No. 11/493,876, entitled SYSTEM AND METHOD FOR MULTI-THREADED RESOLVER by Timothy Hanson, Jesse Michael Garms, and Timothy Allen Wagner filed Jul. 26, 2006.

U.S. application Ser. No. 11/493,320, entitled SYSTEM AND METHOD FOR MULTI-THREADED RESOLVER WITH DEADLOCK DETECTION, by Timothy Hanson, filed Jul. 26, 2006.

FIELD OF THE DISCLOSURE

The present disclosure relates generally to a means for resolving symbol names during program compilation and, more particularly, a multi-threaded means for doing so.

BACKGROUND

Traditional command line programming language compilers are single threaded due to the batch-oriented nature of their work. In the context of user-interactive tools, however, many threads make requests of compiler services. For example, user interface views read and modify compiler data structures, file watching threads push file changes onto the compiler, and interactive editing triggers incremental compilation. In a programming language that has a global type system, threads performing type resolution need information from more than one file. This can lead to duplication of work and race conditions between the threads. What is needed is a way to make type resolution "thread safe" while at the same time preventing threads from becoming deadlocked.

DETAILED DESCRIPTION

The invention is illustrated by way of example and not by way of limitation in the figures of the accompanying drawings in which like references indicate similar items. References to embodiments in this disclosure are not necessarily to the same embodiment, and such references mean at least one. While specific implementations are discussed, it is understood that this is done for illustrative purposes only. A person skilled in the relevant art will recognize that other components and configurations may be used without departing from the scope and spirit of the invention.

In the following description, numerous specific details are set forth to provide a thorough description of the invention. However, it will be apparent to one skilled in the art that the invention may be practiced without these specific details. In other instances, well-known features have not been described in detail so as not to obscure the invention.

Examples are given in terms of the Java® programming language, however those of skill in the art will recognize that the teachings herein are applicable to any programming language with a global type system, including without limitation C# and XML/Schema. (Java® is a registered trademark of Sun Microsystems, Inc.) Likewise, while interactive software development tools can be enriched by using embodiments described herein, the teachings are naturally applicable to many disciplines which are fully within the scope and spirit of the present disclosure.

Figure 1:
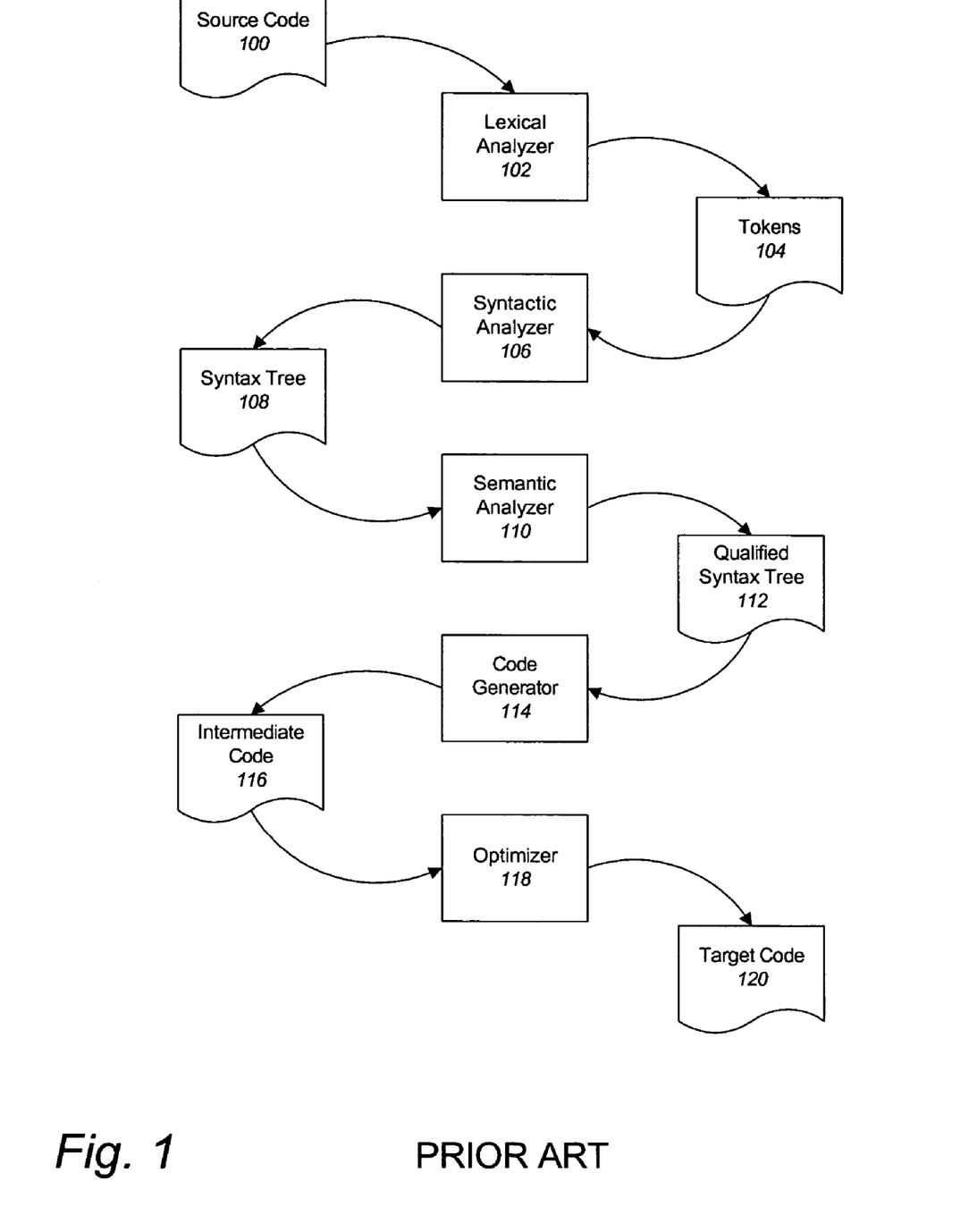
FIG. 1 is an illustration of a programming language compilation phases in which embodiments of this invention can be practiced.

FIG. 1 is an illustration of a programming language compilation phases in which embodiments of this invention can be practiced. Compilation phases can include lexing, parsing, semantic analysis, code generation and optimization. Source code 100 consisting of one or more (complete or incomplete) programming language statements is provide in whole or in part to lexical analyzer 102 which analyzes the source and emits tokens 104. Tokens are processed by syntactic analyzer 106 which in turn creates a syntax tree 108 representation of the source code by analyzing the token stream for structure and symbols. The syntax tree is examined by the semantic analyzer 110 which performs type resolution (or "resolution") by matching occurrences of symbol names with corresponding definitions. The result is a qualified syntax tree 112 which is provided to code generator 114. The code generator produces intermediate code 116 (sometimes called "object code") which can be optimized by optimizer 118 to produce target code 120 for a particular runtime environment.

In various embodiments, resolution of a type can progress in discrete stages. By way of illustration, resolution of a type in the Java programming language can include a plurality of the stages as described in Table 1 below.

TABLE 1

Resolution Stages for a Type

| RESOLUTION STAGE | DESCRIPTION |
| --- | --- |
| 1 | Type Modifiers (e.g., public, static, final, transient, volatile) |
| 2 | Super Types |
| 3 | Member Types (e.g., inner types for members) |
| 4 | Methods/Fields |
| 5 | Constants |

In aspects of these embodiments, resolution information for each stage can be added to a resolved version of the type. For example, consider the following Java type declaration:

```
public class A extends Z {
    public A ( ) {
        field1 = 0;
    }
    private integer field1;
};
```

If resolution of type A progresses to stage 2, a version of the type would contain information pertaining to A's modifiers and supertypes (i.e., public and Z, respectively). Likewise, if resolution reached stage 5, a version of the type would additionally contain the constructor method A( ) and field field1.

In one embodiment, there is a lock or other suitable mechanism associated with each type that can be used to prevent two or more threads from interfering with each other during resolution. In aspects of this embodiment, a thread can acquire a lock for the type before beginning a resolution stage. The thread can then retrieve the latest version of the type from a type repository or other suitable store, create a new copy of that version that can be modified and include additional information for the current stage. The thread can then mark the new copy as immutable, update the type repository with the new version, and release the lock associated with the type. While a type is locked, other threads can inspect prior versions of the type. Having the versions immutable guarantees that any thread examining a type version never sees inconsistent results (i.e., a version cannot be changed underfoot by another thread).

Figure 2:
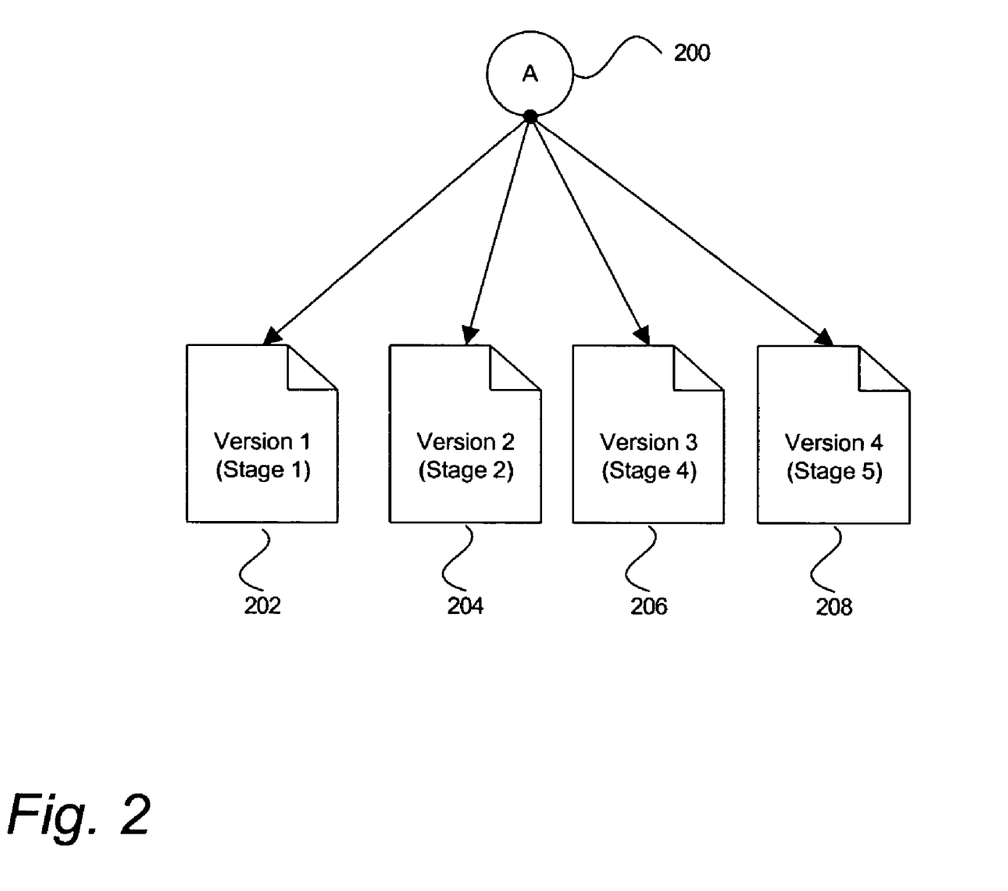
FIG. 2 is an illustration of type versions in accordance to an embodiment.

FIG. 2 is an illustration of type versions in accordance to an embodiment. In one embodiment, a thread creates a new version of a type when it advances resolution of the type. If a thread needs resolved information for a type such as its fields and methods it can first see if there is a version of the type resolved to the appropriate stage. If the version exists, the thread only needs to retrieve it from the type repository. Otherwise, the thread can acquire a lock on the type and move resolution forward to the required stage. As discussed above, this will create a new immutable version of the type that is available to all threads.

Type A 200 in the figure has four versions (202-208) associated with it. Each version was created by a thread and not necessarily the same thread. Version 1 (202) of A is resolved to stage 1, version 2 (204) is also resolved to stage 2, version 3 (206) is resolved to stage 4 and version 4 (208) is resolved to stage 5. Depending on the stage of a version and by way of illustration, a version can contain information including (but not limited to) one or more of the following: a type's modifiers, super types, member types, methods, fields and constants. Versions of a type can be persisted in a type repository or other suitable storage means.

Type versions can be used to avoid duplicating resolution work. For example, a second thread is blocked waiting for the lock associated with a type. Once the first thread releases the lock, the second thread will attempt to acquire the lock. By checking the latest version of the type before beginning resolution, the second thread will either do nothing (having its requirements met by the work done on the first thread) or will move resolution forward—beginning where the previous thread left off.

Figure 3A:
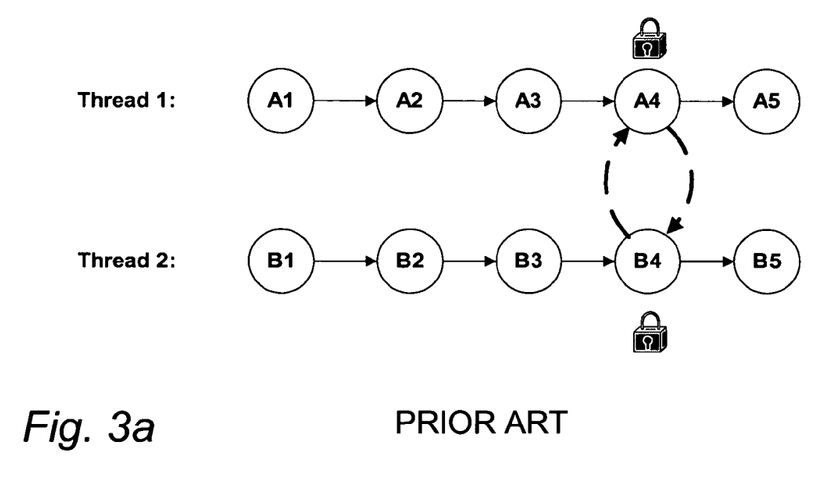
FIG. 3a is an illustration of a deadlock situation that can arise between two threads that are resolving interdependent types.

FIG. 3a is an illustration of a deadlock situation that can arise between two threads that are resolving interdependent types. By way of illustration, assume types A and B are declared as follows:

| Type A | Type B |
|---|---|
| public class A<br>  B field1;<br>}; | public class B<br>  A field2;<br>}; |

Field field1 in class A depends on class B. Likewise, field field2 in class B depends on class A. With reference to FIG. 3a, Thread 1 is resolving type A at stage 4. Thread 2 is resolving type B also at stage 4. A deadlock will occur if Thread 1 held the lock on type A, and then attempted to acquire the lock on type B; and Thread 2 held the lock on type B, and then attempted to acquire the lock on type A. The result: Thread 1 and Thread 2 block indefinitely waiting on the other to release its lock.

Figure 3B:
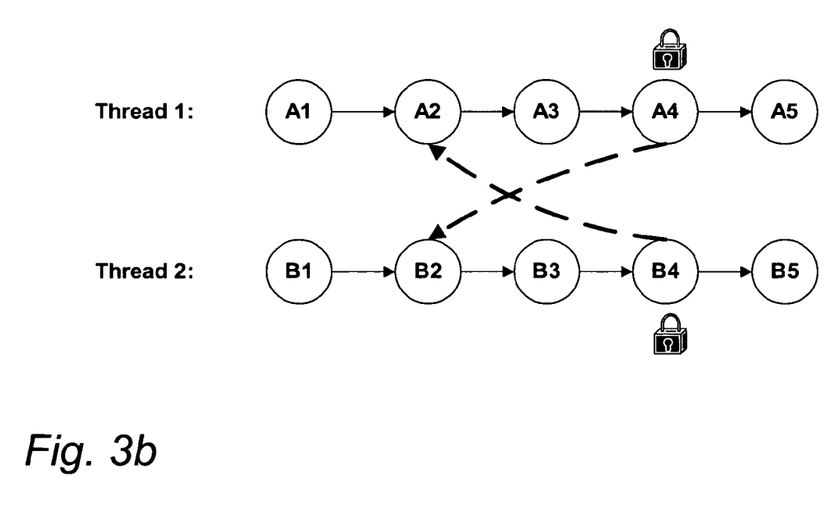
FIG. 3b is an illustration of deadlock avoidance between two threads in accordance to an embodiment.

FIG. 3b is an illustration of deadlock avoidance between two threads in accordance to an embodiment. As with FIG. 3a, field1 in class A depends on type B and field2 in class B depends on type A. Both threads are resolving their respective types at stage 4. If a thread does not require a version of an interdependent type at the same stage or greater as the type it is currently resolving, deadlock can be avoided. In our example, while resolving the fields of type A (stage 4), Thread 1 will request resolution of type B, but it will only request information about the super types of B (stage 2). Thus deadlock will never occur because before Thread 1 requests B at stage 2, Thread 2 is resolving B at stage 3. The same holds true for Thread 2. The requests require no work since versions of A and B at stage 2 already exist—the requests are satisfied from the type repository without the need to acquire the type locks.

An exception to this rule involves the resolution of interdependent super types. For example, consider the following types:

| Type A | Type B |
|---|---|
| public class A extends B<br>  B field1;<br>}; | public class B extends A<br>  A field2;<br>}; |

Figure 4A:
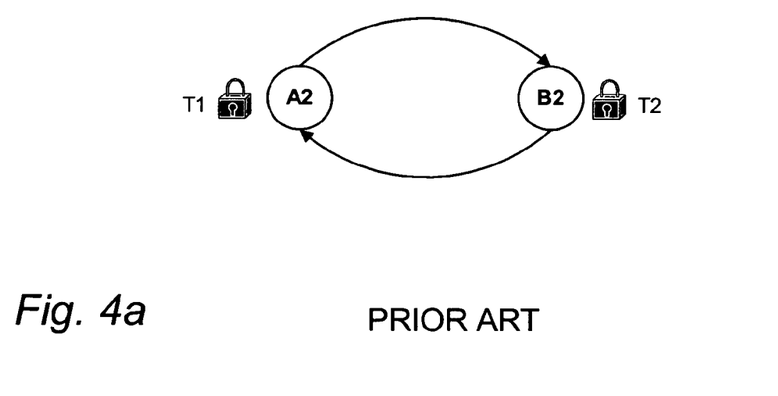
FIG. 4a is an illustration of a deadlock involving resolution of super types.

If type A extends type B and vice versa, this could cause a deadlock between thread T1 (resolving A at stage 2) and thread T2 (resolving B at stage 2) as shown in FIG. 4a since both types are being resolved at the same stage. Although this is not allowed by the Java programming language, for example, it is still possible to create such a program. In one embodiment, this situation can be avoided by checking for a possible deadlock before acquiring the lock associated with a type. If acquiring the lock would cause deadlock, the type can be marked as having illegal circular inheritance.

Figure 4B:
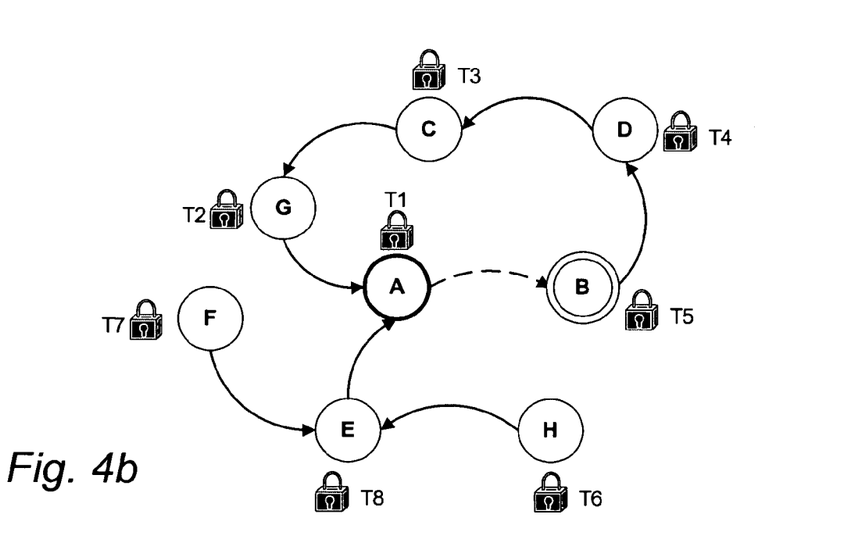
FIG. 4b is an illustration of a type dependency graph containing a cycle.

FIG. 4b is an illustration of a type dependency graph containing a cycle. Assume that in various embodiments a thread holding a lock on a given type can determine which other threads are waiting to acquire that lock. Thus, a thread is related/connected to other threads based on which threads are trying to acquire its lock. In this way, type resolution threads can be viewed as a graph. If a cycle exists in the graph then there is a deadlock between two or more threads. In this figure, thread T1 which holds a lock on type A, wishes to determine if by trying to assert a lock on type B (the "target type"), a deadlock will arise.

In one embodiment, detecting a cycle begins with traversing the graph at a current thread T1. All possible paths from T1 are those threads that are waiting to acquire a lock on type A. In this case, thread T8 (which is resolving type E) and thread T2 (which is resolving type G) are waiting for T1 to release its lock on type A. Thread T8 has two paths leading to it from threads T6 and T7. These paths are dead-ends, since no other thread is waiting to acquire a lock on type H or F. However, from thread T2 it is possible to traverse to the target type B via threads T3 (type C) and T4 (type D). Thus, a cycle (A→B→D→C→G→A) would exist if thread T1 were to attempt to acquire a lock on B.

Figure 5:
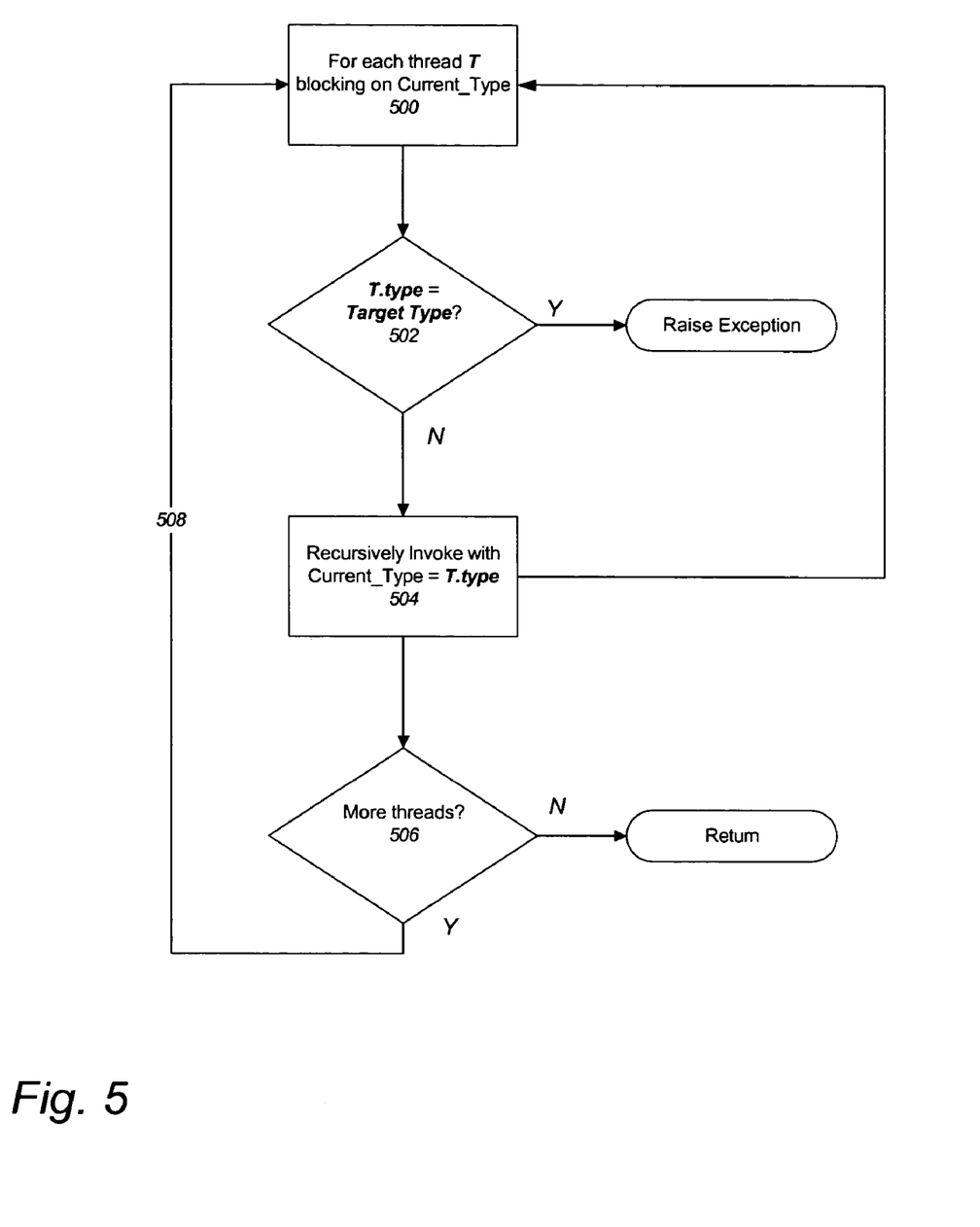
FIG. 5 is an illustration of an algorithm for detecting cycles in between resolution threads in accordance to an embodiment.

In another embodiment, this algorithm can be implemented as a recursive function/method for depth-first traversal of the graph as illustrated in FIG. 5. (It will be apparent to those of the art that this algorithm can also be implemented in a non-recursive, iterative fashion.) In starting block 500, it is determined which threads are waiting to acquire a lock on the current type which is initially the type that is being resolved. For each iteration of loop 508, a different one of these thread(s) (represented by T) is processed. Block 502 determines whether or not the type that is locked by T is the target type. If so, a cyclic dependency exception is raised. Otherwise, block 500 is recursively invoked with the current type set to the type that T is holding the lock on. As recursive calls return, block 506 determines if there are any more threads T to evaluate. If not, the function/method returns. Otherwise, T is set to the next thread and the algorithm continues at block 502. The target type remains the same across all invocations.

Figure 6:
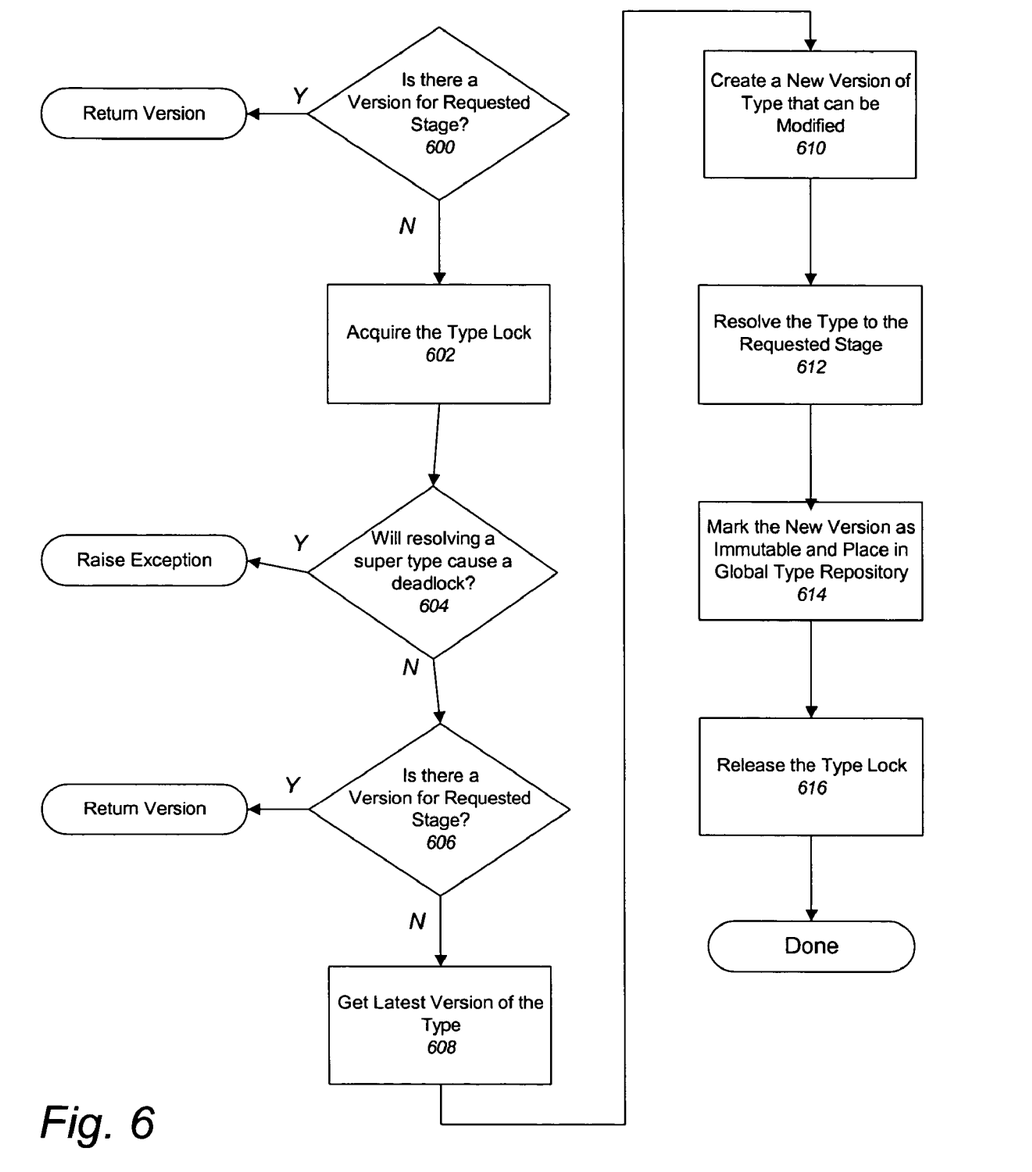
FIG. 6 is a flow diagram for performing type resolution in accordance to an embodiment.

FIG. 6 is a flow diagram for performing type resolution in accordance to an embodiment. Although this figure depicts processing in a particular order for purposes of illustration, one skilled in the art will appreciate that various processes portrayed in this figure can be omitted, rearranged, performed in parallel, combined and/or adapted in various ways as will be apparent to those of skill in the art.

Resolution begins at block 600 wherein it is determined whether or not there already exists a version of the type in the type repository at the desired stage. If so, the version is returned and current resolution thread completes. Otherwise, in block 602 an attempt is made at acquiring the lock for the type. If the lock is already held by another thread, the current thread can block until the lock is released. Once the lock is acquired, it is determined whether or not a super type will be resolved. If so, a determination is made in block 604 as to whether attempting to resolve the super type will cause a deadlock. If so, an exception is raised and the lock is released. In one embodiment (not illustrated), the problematic super type can be dynamically replaced with a global super type (e.g., "Object" in the Java programming language) which will allow compilation to recover and continue past the error.

If no potential deadlock is detected, the type repository is again checked in block 606 to see if another thread has created a version of the type at the desired stage in the time since the current thread acquired the lock. If so, the version is returned and the current resolution thread completes. Otherwise, the latest version of the type is obtained from the type repository (block 608) and copied to create a new, modifiable version in block 610. The type is then resolved to the desired stage and the new version is updated to include any pertinent information in block 612. The new version is marked as immutable and then placed in the type repository (block 614). Finally, the type lock is released in block 616.

Resolution of constants can also involve circularity. For example, considering the following type declarations:

| Type A | Type B |
|---|---|
| public class A<br>    public static int C1 = B.C2;<br>}; | public class B<br>    public static int C2 = A.C1;<br>}; |

In one embodiment, constants can be resolved using per-field locking. If a deadlock would arise if one thread was to assert a lock on another thread, the constant's value is set to zero.

Although a diagram may depict components as logically separate, such depiction is merely for illustrative purposes. It will be apparent to those skilled in the art that the components portrayed can be combined or divided into separate software, firmware and/or hardware components. Furthermore, it will also be apparent to those skilled in the art that such components, regardless of how they are combined or divided, can execute on the same computing device or can be distributed among different computing devices connected by one or more networks or other suitable communication means.

Various embodiments may be implemented using a conventional general purpose or specialized digital computer(s) and/or processor(s) programmed according to the teachings of the present disclosure, as will be apparent to those skilled in the computer art. Appropriate software coding can readily be prepared by skilled programmers based on the teachings of the present disclosure, as will be apparent to those skilled in the software art. The invention may also be implemented by the preparation of integrated circuits and/or by interconnecting an appropriate network of conventional component circuits, as will be readily apparent to those skilled in the art.

Various embodiments include a computer program product which is a storage medium (media) having instructions stored thereon/in which can be used to program a general purpose or specialized computing processor(s)/device(s) to perform any of the features presented herein. The storage medium can include, but is not limited to, one or more of the following: any type of physical media including floppy disks, optical discs, DVDs, CD-ROMs, microdrives, magneto-optical disks, holographic storage, ROMs, RAMs, PRAMS, EPROMs, EEPROMs, DRAMs, VRAMs, flash memory devices, magnetic or optical cards, nanosystems (including molecular memory ICs); paper or paper-based media; and any type of media or device suitable for storing instructions and/or information. Various embodiments include a computer program product that can be transmitted in whole or in parts and over one or more public and/or private networks wherein the transmission includes instructions which can be used by one or more processors to perform any of the features presented herein. In various embodiments, the transmission may include a plurality of separate transmissions.

Stored one or more of the computer readable medium (media), the present disclosure includes software for controlling both the hardware of general purpose/specialized computer(s) and/or processor(s), and for enabling the computer(s) and/or processor(s) to interact with a human user or other mechanism utilizing the results of the present invention. Such software may include, but is not limited to, device drivers, operating systems, execution environments/containers, user interfaces and applications.

The foregoing description of the preferred embodiments of the present invention has been provided for purposes of illustration and description. It is not intended to be exhaustive or to limit the invention to the precise forms disclosed. Many modifications and variations will be apparent to the practitioner skilled in the art. Embodiments were chosen and described in order to best explain the principles of the invention and its practical application, thereby enabling others skilled in the relevant art to understand the invention. It is intended that the scope of the invention be defined by the following claims and their equivalents.

What is claimed is:

1. A method for resolving a type in a programming language to a resolve stage, comprising, performed by a processor, the following steps:
    determining whether a version at the resolve stage of the type exists;
    if the version at the resolve stage does not exist:
        allowing a thread exclusive access to the type;
        resolving the type from an original resolve stage to the resolve stage by the thread, by adding resolution information for the resolve stage to the type, wherein the resolve stage indicates how far a processing of the resolving has progressed for the type; and
        creating the version of the type based on the resolving by creating a copy of the type, wherein the copy of the type is at the resolve stage, and wherein two or more versions are associated with the type, and the two or more version are at different resolve stages.

2. The method of claim 1 wherein:
the version is an immutable copy of the type.

3. The method of claim 1 wherein:
the thread is a strand of program execution that execute simultaneously with a second thread.

4. The method of claim 1 wherein:
the type is a class.

5. The method of claim 1 wherein the step of resolving includes:
    resolving one of the following for the type: modifier(s), super type(s), member type(s), method(s)/field(s) and constant(s).

6. The method of claim 1, further comprising:
allowing a second thread exclusive access to the type.

7. The method of claim 1 wherein the step of resolving includes:
    resolving a second type to a second resolve stage wherein the type depends on the second type.

8. The method of claim 7 wherein:
the second resolve stage is less than the resolve stage.

9. The method of claim 1, further comprising:
    determining if the thread and a second thread would become deadlocked if the thread attempted to resolve the type.

10. The method of claim 9, wherein the step of determining if the thread and a second thread would become deadlocked further comprises:
    determining if a cycle of dependency exists between the type and a second type wherein the second type is being resolved by the second thread.

11. A system for resolving a type in a programming language, comprising at least one processor capable of performing the following steps:
    determining whether a version at a resolve stage of the type exists;
    if the version at the resolve stage does not exist:
        allowing a thread exclusive access to the type;
        resolving the type from an original resolve stage to the resolve stage, by the thread, by adding resolution information for the resolve stage to the type, wherein the resolve stage indicates how far a processing of the resolving has progressed for the type; and
        creating the version of the type based on the resolving by creating a copy of the type, wherein the copy of the type is at the resolve stage, and wherein two or more versions are associated with the type, and the two or more version are at different resolve stages.

12. The system of claim 11 wherein:
the version is an immutable copy of the type.

13. The system of claim 11 wherein:
the thread is a strand of program execution that execute simultaneously with a second thread.

14. The system of claim 11 wherein:
the type is a class.

15. The system of claim 11 wherein the step of resolving includes:
    resolving one of the following for the type: modifier(s), super type(s), member type(s), method(s)/field(s) and constant(s).

16. The system of claim 11, further comprising:
allowing a second thread exclusive access to the type.

17. The system of claim 11 wherein the step of resolving includes:
    resolving a second type to a second resolve stage wherein the type depends on the second type.

18. The system of 17 wherein:
the second resolve stage is less than the resolve stage.

19. A non-transitory machine readable medium having instructions stored thereon to cause a system to:
    determine whether a version at a resolve stage of a type exists;
    if the version at the resolve stage does not exist:
        allow a thread exclusive access to the type;
        resolve the type from an original resolve stage to the resolve stage, by the thread, by adding resolution information for the resolve stage to the type, wherein the resolve stage indicates how far a processing of the resolving has progressed for the type; and
        create the version of the type based on the resolving by creating a copy of the type, wherein the copy of the type is at the resolve stage, and wherein two or more versions are associated with the type, and the two or more versions are at different resolve stages.

20. A system for resolving a type in a programming language, comprising at least one processor, the system further comprising:
    means for determining whether a version at a resolve stage of the type exists;
    if the version at the resolve stage does not exist:
        means for allowing a thread exclusive access to the type;
        means for resolving the type from an original resolve stage to the resolve stage, by the thread, by adding resolution information for the resolve stage to the type, wherein the resolve stage indicates how far a processing of the resolving has progressed for the type; and
        means for creating the version of the type based on the resolving by creating a copy of the type, wherein the copy of the type is at the resolve stage, and wherein two or more versions are associated with the type, and the two or more versions are at different resolve stages.

* * * * *